United States Patent
Agashe et al.

(10) Patent No.: US 7,167,458 B2
(45) Date of Patent: Jan. 23, 2007

(54) METHOD AND APPARATUS FOR DETERMINING A NUMBER OF TIMES A MESSAGE IS TRANSMITTED ON A PAGING CHANNEL TO A MOBILE STATION

(75) Inventors: Parag A. Agashe, San Diego, CA (US); Paul E. Bender, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 996 days.

(21) Appl. No.: 10/160,593

(22) Filed: May 30, 2002

(65) Prior Publication Data

US 2003/0223388 A1 Dec. 4, 2003

(51) Int. Cl.
*H04J 3/16* (2006.01)
(52) U.S. Cl. .................................... 370/329
(58) Field of Classification Search ........ 370/328–329, 370/335, 342, 252; 455/101, 133
See application file for complete search history.

(56) References Cited

U.S. PATENT DOCUMENTS

| | | | | |
|---|---|---|---|---|
| 5,625,880 A | * | 4/1997 | Goldburg et al. | 340/7.22 |
| 5,826,172 A | * | 10/1998 | Ito et al. | 340/7.44 |
| 6,111,865 A | * | 8/2000 | Butler et al. | 370/335 |
| 7,006,468 B1 | * | 2/2006 | Chen et al. | 370/330 |
| 2001/0043578 A1 | * | 11/2001 | Kumar et al. | 370/331 |
| 2003/0232629 A1 | * | 12/2003 | Jang et al. | 455/552.1 |

* cited by examiner

*Primary Examiner*—Huy D. Vu
*Assistant Examiner*—Nittaya Juntima
(74) *Attorney, Agent, or Firm*—Philip Wadsworth; Thien T. Nguyen; S. Hossain Beladi

(57) ABSTRACT

Method and apparatus for use in a communication system (100) are provided for determining a number of times a message is transmitted on a paging channel. A controller (210, 401) selects a mobile station (102, 103, 104) to receive a general page message on a paging channel in communication system (100). A transceiver (400) transmits the general page message to the mobile station for a number of times until receiving a page response message from the mobile station. The controller (210, 401) determines a maximum number of times a channel assignment message to be transmitted to the mobile station, following receiving the page response message, based on the number of times the general page message is transmitted to the mobile station. The transceiver (400) transmits the channel assignment message to the mobile station up to the determined maximum number of times.

12 Claims, 7 Drawing Sheets

| MOBILE STATION | CHANNEL | | CHANNEL | BASE STATION | |
|---|---|---|---|---|---|
| DOES NOT RECEIVE GENERAL PAGE MESSAGE | ↓X | PAGING CHANNEL | ↓ | SENDS GENERAL PAGE MESSAGE | 501 |
|  |  |  |  | WAIT FOR TIME T1 TO RECEIVE PAGE RESPONSE MESSAGE | 502 |
| RECEIVES GENERAL PAGE MESSAGE | ↓ | PAGING CHANNEL | ↓ | RE-SENDS GENERAL PAGE MESSAGE | 503 |
| SENDS PAGE RESPONSE MESSAGE | ↑ | ACCESS CHANNEL | ↑ | RECEIVES PAGE RESPONSE MESSAGE | 504 |
|  |  | FORWARD TRAFFIC CHANNEL | ↓ | SETS UP TRAFFIC CHANNEL AND BEGINS TRANSMITTING NULL TRAFFIC CHANNEL DATA | 505 |
| RECEIVES CHANNEL ASSIGNMENT MESSAGE | ↓ | PAGING CHANNEL | ↓ | SENDS CHANNEL ASSIGNMENT MESSAGE | 506 |
|  | ↓ | PAGING CHANNEL | ↓ | SENDS CHANNEL ASSIGNMENT MESSAGE | 507 |
| RECEIVES N5m CONSECUTIVE VALID FRAMES ON THE FORWARD TRAFFIC CHANNEL |  |  |  |  | 508 |
| BEGINS SENDING TRAFFIC CHANNEL PREAMBLE | ↑ | REVERSE TRAFFIC CHANNEL | ↑ | ACQUIRES REVERSE TRAFFIC CHANNEL | 509 |

METHOD AND APPARATUS FOR DETERMINING A NUMBER OF TIMES A MESSAGE IS TRANSMITTED ON A PAGING CHANNEL TO A MOBILE STATION

FIELD

The present invention relates generally to the field of communications, and more specifically, to communications using a receive diversity technique.

BACKGROUND

The communication channel between a transmitter and a receiver is susceptible to noise, interference, and multipath. Multiple antennas may be used at the receiving destination to enhance the received signal. A receiver chain for signals received at each antenna may be necessary. Therefore, multiple receiver chains may be necessary to exploit the signals received at multiple receive antennas.

The transmitter may transmit a message multiple times to the receiver to improve the probability of the message being received without error. Processing a received channel may be accomplished using receiver diversity by combining the received signals. When the signals are combined at the receiver, the effective carrier to noise ratio of the channel may be increased to a level above the minimum level required for processing the channel. As a result, the transmitter may transmit the message fewer number of times without affecting the message error rate. The reduction in the number of times a message is transmitted allows the transmitter to transmit a higher number of different messages or reduce the interference level for other receivers. As such, use of receiver diversity at the mobile station improves the reliability and increases the capacity of the communication system.

To this end as well as others, there is a need for determining the number of times a message is transmitted on various channels in a communication system.

SUMMARY

Method and apparatus for use in a communication system are provided for determining a number of times a message is transmitted on a paging channel. A controller selects a mobile station to receive a general page message on a paging channel in communication system. A transceiver transmits the general page message to the mobile station for a number of times until receiving a page response message from the mobile station. The controller determines a maximum number of times a channel assignment message to be transmitted to the mobile station, following receiving the page response message, based on the number of times the general page message is transmitted to the mobile station. The transceiver transmits the channel assignment message to the mobile station up to the determined maximum number of times. The number of times the general page message transmitted to the mobile station may be determined based on whether the mobile station is using receive diversity.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 illustrates a flow diagram of messages communicated between a mobile station and a base station;

DETAILED DESCRIPTION OF THE PREFERRED EMBODIMENT(S)

Generally stated, the communications between a mobile station and base station may be accomplished by multiple transmissions of a message. The number of transmissions may be controlled and minimized when the mobile station is using receive diversity, in accordance with various aspects of the invention. The transmissions may be over a paging channel. The message may be a general page message, or a channel assignment message. One or more exemplary embodiments described herein are set forth in the context of a digital wireless communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, various aspects of the invention provide for efficient use of communication resources in a CDMA communication system by limiting the number of transmissions of a message to a mobile station. In accordance with at least one aspect of the invention, the number of transmissions is based on whether the receiving mobile station is using receive diversity. The use of receive diversity, therefore, produces its beneficial features, such as improving system capacity to accommodate more users and preventing erroneous decoding of the received data.

Figure 1:
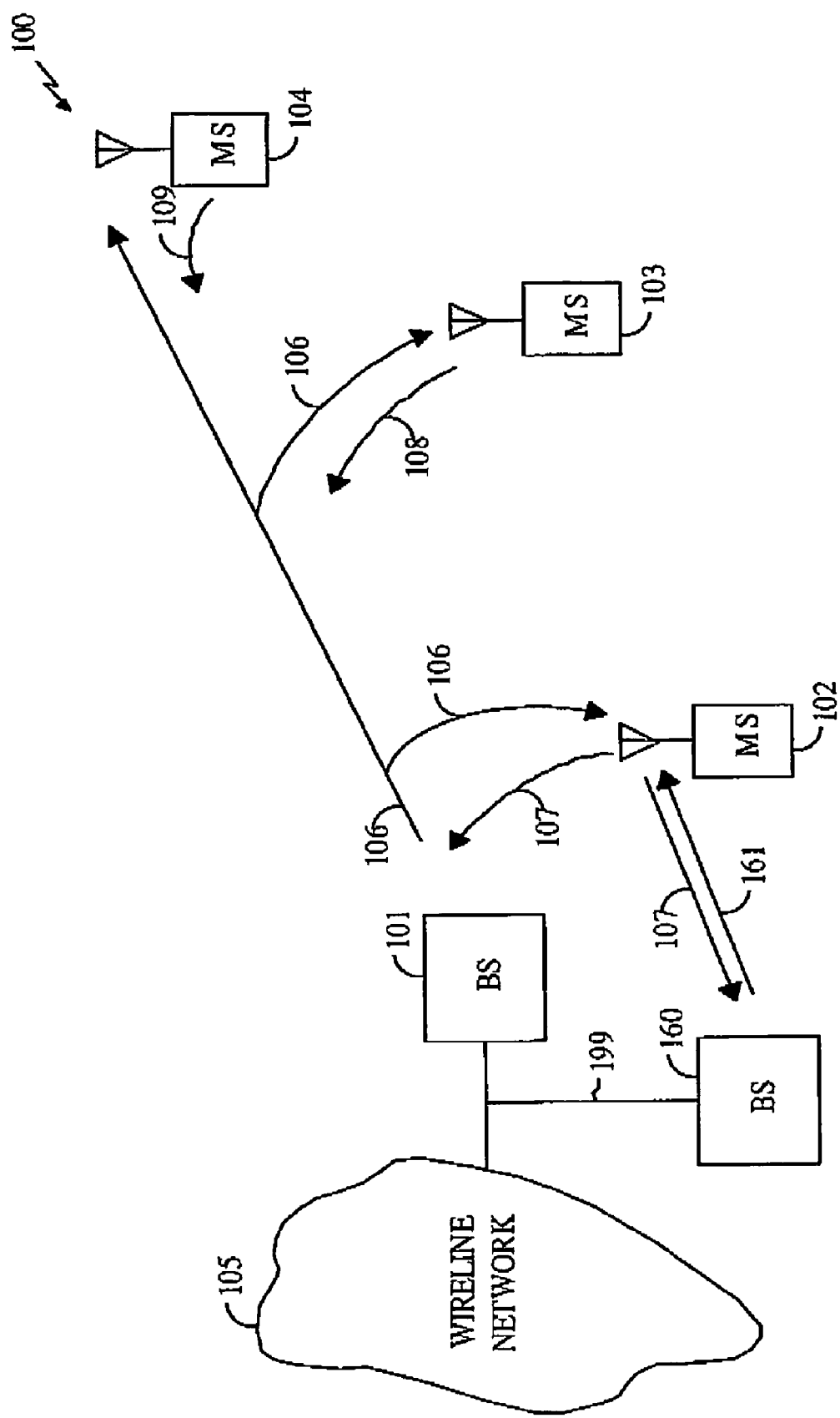
FIG. 1 depicts a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respectively mobile stations 102–104. The reverse link signals 107–109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102.

The communication system 100 may also employ use of pilot channels for proper decoding of various channels. A pilot channel contains a series of predefined data. A receiver receives the pilot channel to determine various characteristics of the propagation channel. One of the characteristics may be a carrier to interference ratio (Ec/Io) of the pilot channel. The pilot channel may be used to decode other received channels. The forward and reverse links may have pilot channels. On the forward link, a base station may transmit a pilot channel for all the mobile stations in its coverage area. On the reverse link, each mobile station may combine the reverse link channels with a pilot channel.

Figure 2:
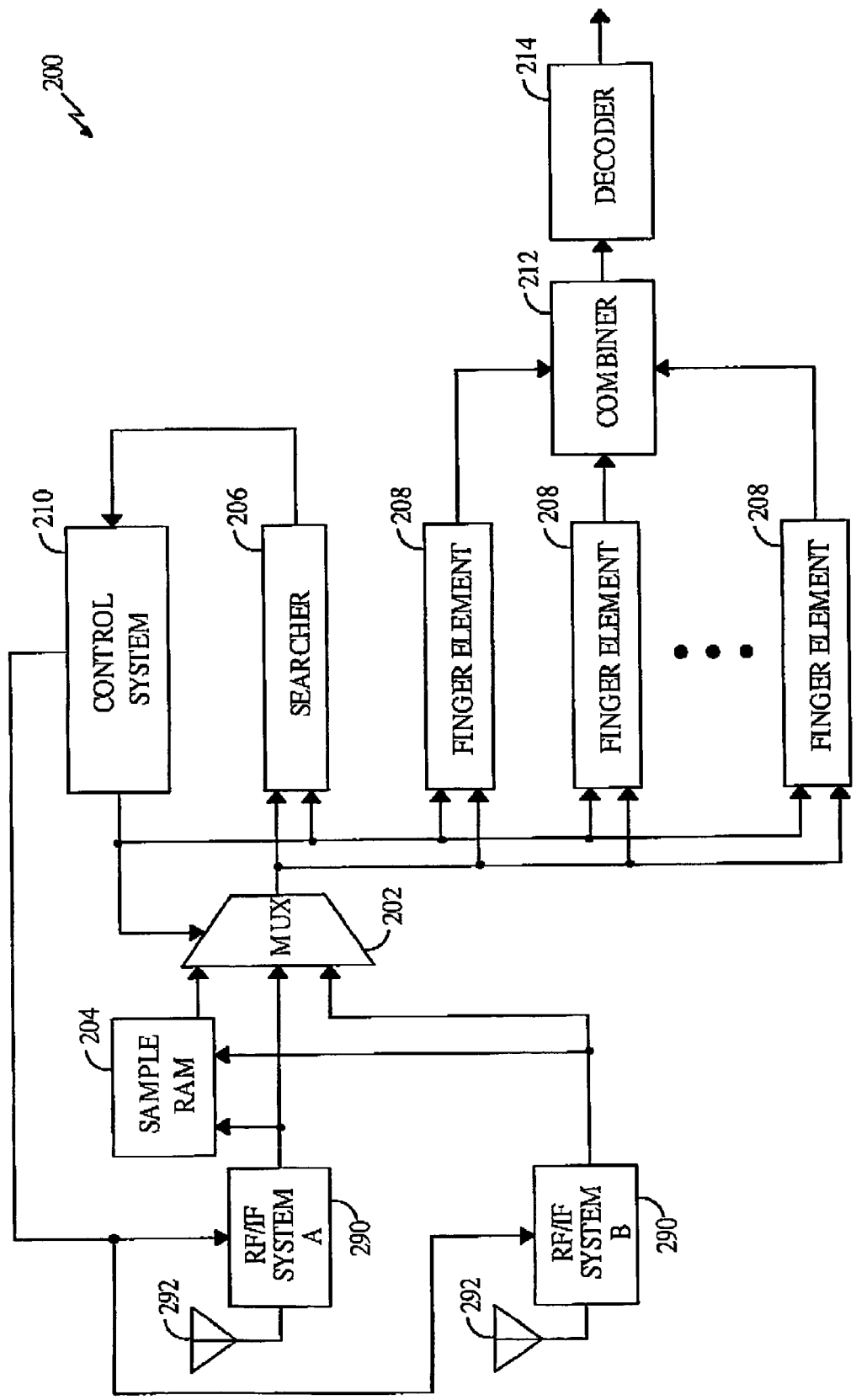
FIG. 2 depicts a communication system receiver for receiving and decoding received data in accordance with various aspects of the invention.

FIG. 2 illustrates a block diagram of a receiver 200 used for processing and demodulating the received CDMA signal in accordance with various aspects of the invention. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. For example, RF/IF system 290 may include the RF/IF systems 290A and 290B, each being considered a receiver chain. More than two receiver chains may also be used. Each element of antenna system 292 receives an RF signal, and passes the received RF signal to a receiver chain in the RF/IF system 290. RF/IF system 290 may be any conventional RF/IF receiver. The RF/IF system 290 may be a "zero" intermediate frequency (ZIF) receiver. The received RF signals are filtered, down-converted and digitized to form RX samples at base band frequencies. The samples are supplied to a multiplexer (mux) 202. The output of mux 202 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to mux 202. Mux 202 supplies the samples to searcher unit 206 and finger elements 208. Control system 210 configures finger elements 208 to perform demodulation and despreading of the received signal at different time offsets based on search results from searcher unit 206. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. The searcher 206 may decode the pilot channel to determine the channel condition, such as determining Ec/Io. If the Ec/Io of the pilot channel of the transmitting source is above a threshold, the control system 210 may decide to assign finger elements 208 to process other received channels from the same source. In the mobile station, various lists of base stations with adequate pilot channel Ec/Io are kept. The lists may include an active list of base stations, a candidate list of base stations, a neighboring list of base stations and a remaining list of base stations. The lists of the base stations may be organized in accordance with the received Ec/Io level. The base stations in the active list have the strongest received Ec/Io. The base stations in the active list are capable of communicating with the mobile station at any time. The mobile station also monitors the active set base stations for receiving a page message. The mobile station may monitor a paging channel for receiving a page message. The paging channel of the active set base stations may be monitored. In accordance with various aspects of the invention, control system 210 controls the receive diversity used for processing the received channels, including the paging channels. The receive diversity is controlled by the control system 210 selecting the number of receiver chains used in the RF/IF system 290 for decoding the received channel. The scale of the receive diversity may be related to the number of selected receiver chains. Large scale receive diversity may refer to using a large number of receiver chains. For example, when four receiver chains are available, the receive diversity scale may range from using one to four receiver chains. When no receive diversity is used, only one receiver chain may be used to process the received channels. The receiver 200 may be incorporated in a mobile station and configured for use in the communication system 100.

The process of using receive diversity may include combining received signals. The multiple received signals may be combined in accordance with any of the commonly known combining processes, such as maximal-ratio combining (MRC) and minimum mean-squared error (MMSE). Temporal combining, spatial combining, or a combination of both, may be used for the combining process. In temporal combining, the signals received through different propagation paths are combined. In the spatial combining, the signals received at different antennas and propagated through the same path are combined. In receiver 200, the results of the demodulation are combined in accordance with the receive diversity process, and the combined result are passed to decoder 214. Decoder 214 decodes the data and outputs the decoded data. Receiver 200 may be used in a receiver portion of base stations 101 and 160 for processing the received reverse link signals from the mobile stations, and in a receiver portion of any of the mobile stations for processing the received forward link signals. The performance of the received channel, such as frame or packet error rate, may be communicated from decoder 214 to control system 210 for controlling receive diversity in receiver 200. For example, when the packet error rate is increased, the receive diversity may be turned on or the scale of the receive diversity may be increased.

Figure 3:
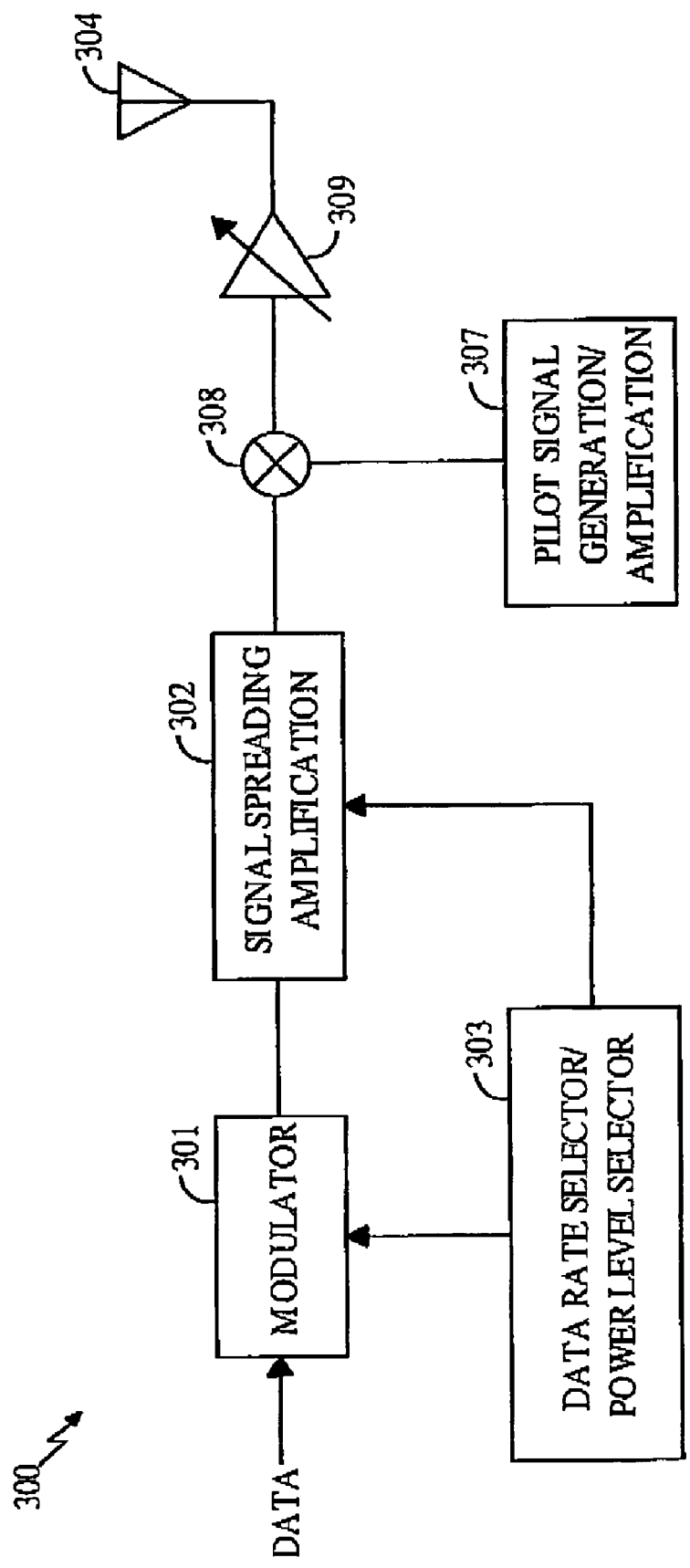
FIG. 3 depicts a communication system transmitter for transmitting data packets in accordance with various aspects of the invention.

FIG. 3 illustrates a block diagram of a transmitter 300 for transmitting the reverse and forward link signals. The channel data for transmission are input to a modulator 301 for modulation. The channel data may be the paging channel data. The paging channel data may be the general page message or channel assignment message. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. The transmit power level may be limited within a predefined range. The transmit power range may have a lower limit and an upper limit. The lower limit of the transmit power range may be based on the rate at which the feedback information can cause the power to increase if the channel condition suddenly became worse. The upper transmit power limit may be based on the maximum amount of power resource that the transmitter is willing to allocate to a single receiver.

A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
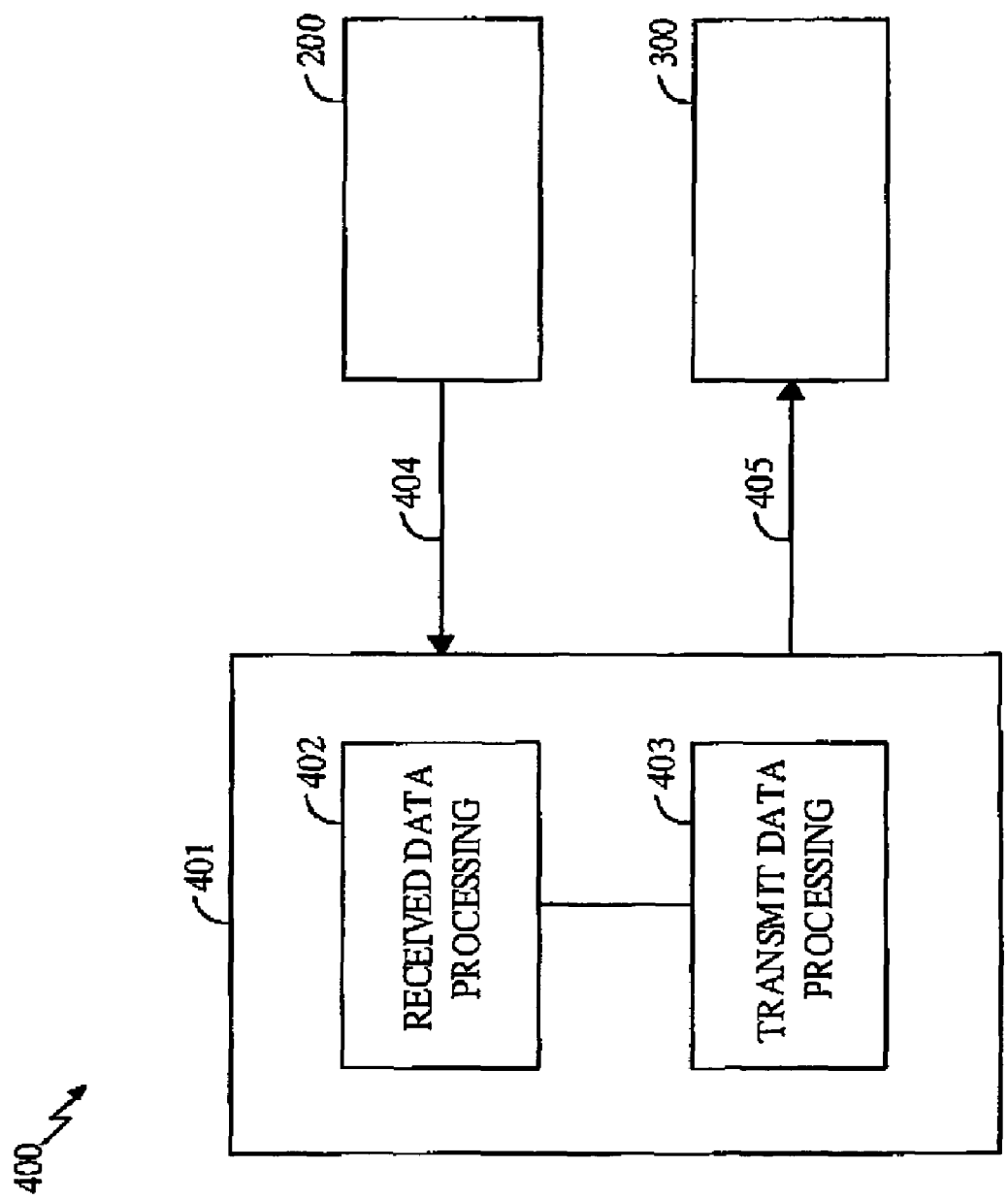
FIG. 4 depicts a transceiver system capable of operating in accordance with various embodiments of the invention.
Figure 6:
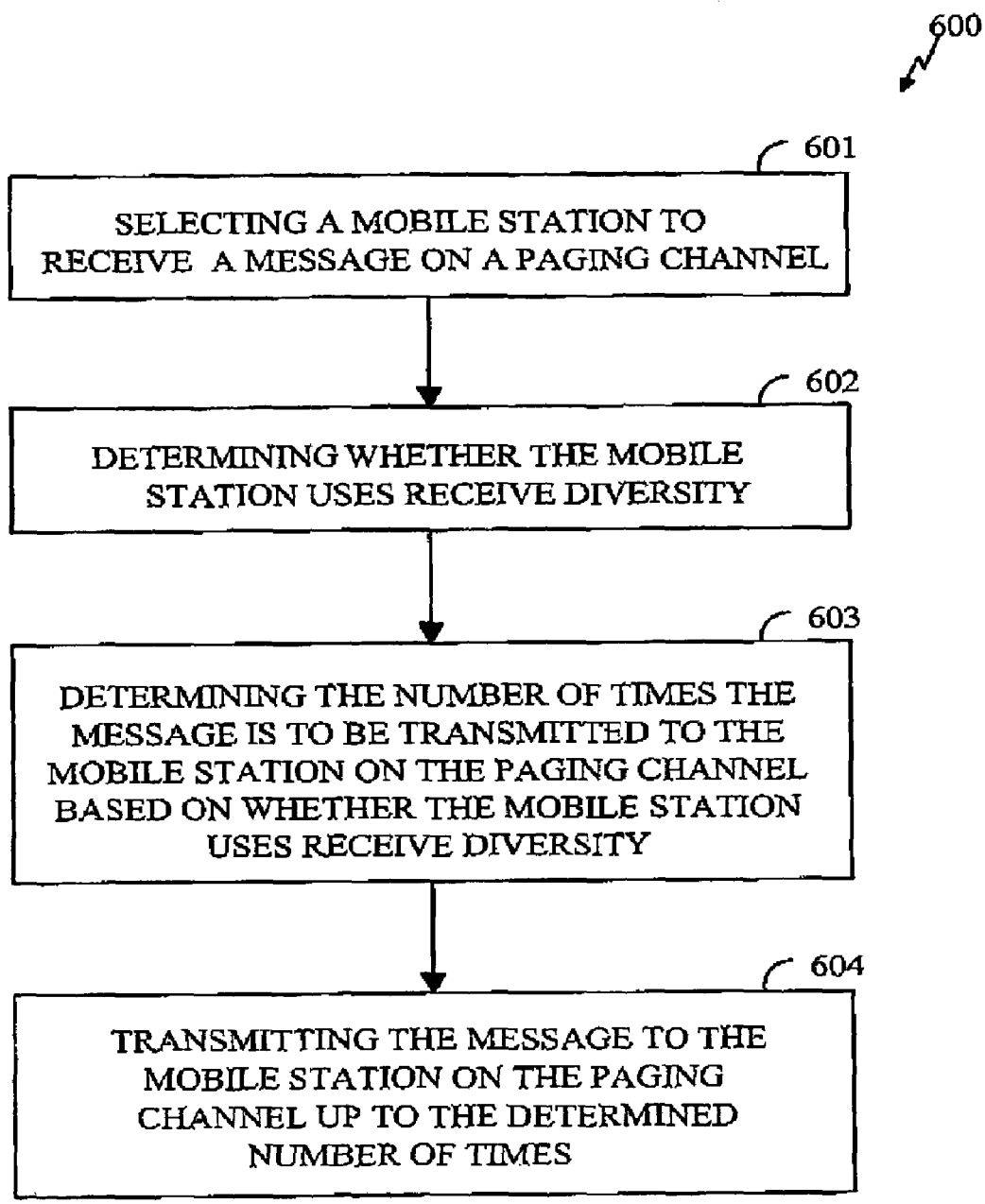
FIG. 6 illustrates a flow diagram for determining the number of times a message is transmitted on a paging channel in accordance with various aspects of the invention.

FIG. 4 depicts a general block diagram of a transceiver system 400 for incorporating receiver 200 and transmitter 300 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting.

On the transmitting side, transmit data processing block 403 prepares the data for transmission on a transmit channel. Transmitter 300 receives the data for transmission on input 405, and transmits the data from an antenna system. On the receiving side, after the received data are decoded, the decoded data are received at processor 400 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or may operate similar to a computer. The device may be connected to a data network, such as Internet. In case of incorporating the transceiver 400 in a base station, the base station through several connections may be connected to a network, such as Internet.

Establishing a communication link between a mobile station and a base station may be in accordance with communications of a predefined set of messages over a paging channel. One or more of the messages may be transmitted multiple times. The number of times each message may be transmitted may be based on whether the receiving mobile station is using receive diversity, in accordance with various aspects of the invention. Referring to FIG. 5, an exemplary set of steps 500 for communicating a flow of messages between a base station and a mobile station is shown. The flow of messages, as shown, may be for establishing a communication link on a traffic channel between the mobile station and a base station in communication system 100. At step 501, the base station transmits a general page message to the mobile station to inform the mobile station of an incoming call. The page message is transmitted on a paging channel. The mobile station, to conserve its battery life, most likely operates in a slotted mode during such a stage of communication.

The mobile station may periodically shut off and wake up in predefined assigned time periods to monitor a quick paging channel (QPCH). If the QPCH indicates possibility of a message for the mobile station, the mobile station directs its resources to monitor an assigned paging channel, a broadcast common channel or a common control channel. The directed channel may carry a detailed message directing the mobile station to process other channels. The QPCH carries indications of a page directed to the mobile station. The transmission of QPCH may be at a predefined power level to reach as many mobile stations in the coverage area of the transmitter. The QPCH, and other similar channels, therefore, may be transmitted without exploiting a power control scheme. The data in the QPCH may be hashed for two groups of mobile stations for receiving paging indications at different times. The mobile stations in the first group wake up during one time period to receive a QPCH and the second group at another time period. As a result, the mobile stations may conserve battery power while maintaining full functionalities.

The QPCH contains a single bit message to direct the mobile stations. If a mobile station detects a "zero", for example, indicating no message during its assigned time period, the mobile station may go back to sleep until the next assigned time period. If the mobile station detects a "one", for example, indicating a page, the mobile station assigns its resources to monitor other related channels, such as the paging channel. Receive diversity is beneficial for decoding the paging indication bit in the QPCH.

In an application titled: Method and Apparatus for Receive Diversity in a Communication System, filed on Feb. 19, 2002, with an assigned application Ser. No. 10/079,956, incorporated by reference herein, discloses one or method and apparatus for receive diversity in a communication system. In another application titled: Method and Apparatus for Determining Receive Diversity in Mobile Station, filed on Apr. 5, 2002, and an assigned application Ser. No. 10/117,893, now U.S. Pat. No. 7,072,628, issued Jul. 4, 2006, incorporated by reference herein, discloses method and apparatus for receive diversity in a communication system. In communication system 100 for decoding a quick paging channel (QPCH), a receiver determines a channel condition of a pilot channel received at the mobile station. The control system 210 or processor 401 determines receive diversity at receiver 200 of the mobile station by determining a number of a plurality of receiver chains 290 in the receiver for receive diversity based on the determined channel condition. The receiver determines the data bits of the QPCH received at the mobile station in accordance with processing of one or more signals produced based on the determined receive diversity. Therefore, the mobile station may be using receive diversity when decoding a directed channel, such as the paging channel. As a result, the reception of a page message transmitted at step 501 may be via use of receive diversity at the mobile station. The transmitting base station, may have information about whether the mobile station is using receive diversity in decoding the paging channel.

Referring again to FIG. 5, at step 502, the base station waits for a period of time to receive a general page response message from the mobile station. After the wait period expires, the base station retransmits the general message to the mobile station at step 503. The base station may retransmit the message several times before receiving a general page response message from the mobile station. The base station may repeat transmitting the page message for a predetermined number of times, for example four to seven times. However, the mobile station may be using receive diversity for receiving the general page message. The receive diversity may have been enabled based on the decoding of the QPCH. The mobile station may also turn on the receive diversity based on a predefined configuration. The base station may limit the number of transmissions of the general page message based on whether the mobile station is using receive diversity for receiving the general page message. The number of transmissions may be lower for a mobile station that is using receive diversity than a mobile station that does not use receive diversity for decoding the page channel. The mobile station may not decode the message due to many adverse channel condition. However, when the mobile station is using receive diversity, the probability of receiving the general page message at the mobile station is a lot higher. As such, the base station may set a lower limit for the number of transmissions allowed for a mobile station that is using receive diversity for receiving a general page message on a paging channel.

At step 504, the base station may receive a page response message from the mobile station in response to the general page message. At step 505, the base station sets up a forward link traffic channel for the mobile station. The base station may transmit null data on the forward link traffic channel until the mobile station acquires the forward link traffic channel. At step 506, the base station transmits a channel assignment message to the mobile station on the paging channel. The channel assignment message contains information about establishing the traffic channel communication link between the base station and the mobile station. The channel assignment message may be transmitted several times, consecutively or spaced in time, to the mobile station. At step 507, the message is again transmitted to the mobile station, even though the mobile station may have received the channel assignment message transmitted at step 506. If the mobile station is using the receive diversity option, the mobile station may receive the channel assignment message on the first transmission. In accordance with various aspects of the invention, the base station may limit the number of channel assignment message transmissions on the paging channel to a lower number for a mobile station that is using receive diversity than a mobile station that is not using receive diversity. At step 508, the mobile station receives the null data on the forward link traffic channel. At step 509, the mobile station begins transmitting preamble data on the reverse link channel. The process for establishing a traffic channel communication between the mobile station and the base station may include other steps.

In accordance with various aspects of the invention, receive diversity in communication system 100 may be determined for a receiver, such as receiver 200, including a plurality of receiver chains, such as receiver chains 290. A control system, such as control system 210 or processor 401, controls receive diversity of the receiver 200 by selecting a number of the plurality of receiver chains 290. The transmitter 300 also may limit the number of times a message is transmitted on the paging channel based on whether receiver 200 in a receiving station such as mobile station that has enabled receive diversity. The scale of receive diversity may determine the number of times the message is transmitted. For example, when a high number of receiver chains is enabled, the base station uses fewer number of transmissions for transmitting a message on the paging channel.

Various aspects of the invention may be more apparent by referring to flow diagram 600. At step 601, the base station controller may select a mobile station to receive a message on a paging channel. The message may be a general page message. The base station controller may determine whether the mobile station is using receive diversity, at step 602. In addition or alternative, the message may be the channel assignment message after receiving the page response message from the mobile station. Use of receive diversity by the mobile station may be determined based on the number of transmissions of the general page message that was required before receiving a response from the mobile station. In alternative or in addition, the base station may keep a log of the mobile stations that use receive diversity for receiving on the paging channel. The base station controller may use the log to determine whether the mobile station is using receive diversity for receiving on the paging channel. At step 603, the number of times the message to be transmitted to the mobile station on the paging channel is determined based on whether the mobile station uses receive diversity. The number of transmissions may also be determined on the scale of diversity. At step 604, the base station transmits the message to the mobile station up to the determined number of times. In case the message is a general page message, the base station waits for a period of time between each transmission to allow time for receiving a page response message from the mobile station. If the page response is not received, the transmission of the page response message is repeated up to the number of times determined at step 603. In case the message is a channel assignment message, the message may be transmitted a number of times consecutively up to the determined number of times. The determined number of times for transmission of the general page message and the channel assignment message may be different.

Figure 7:
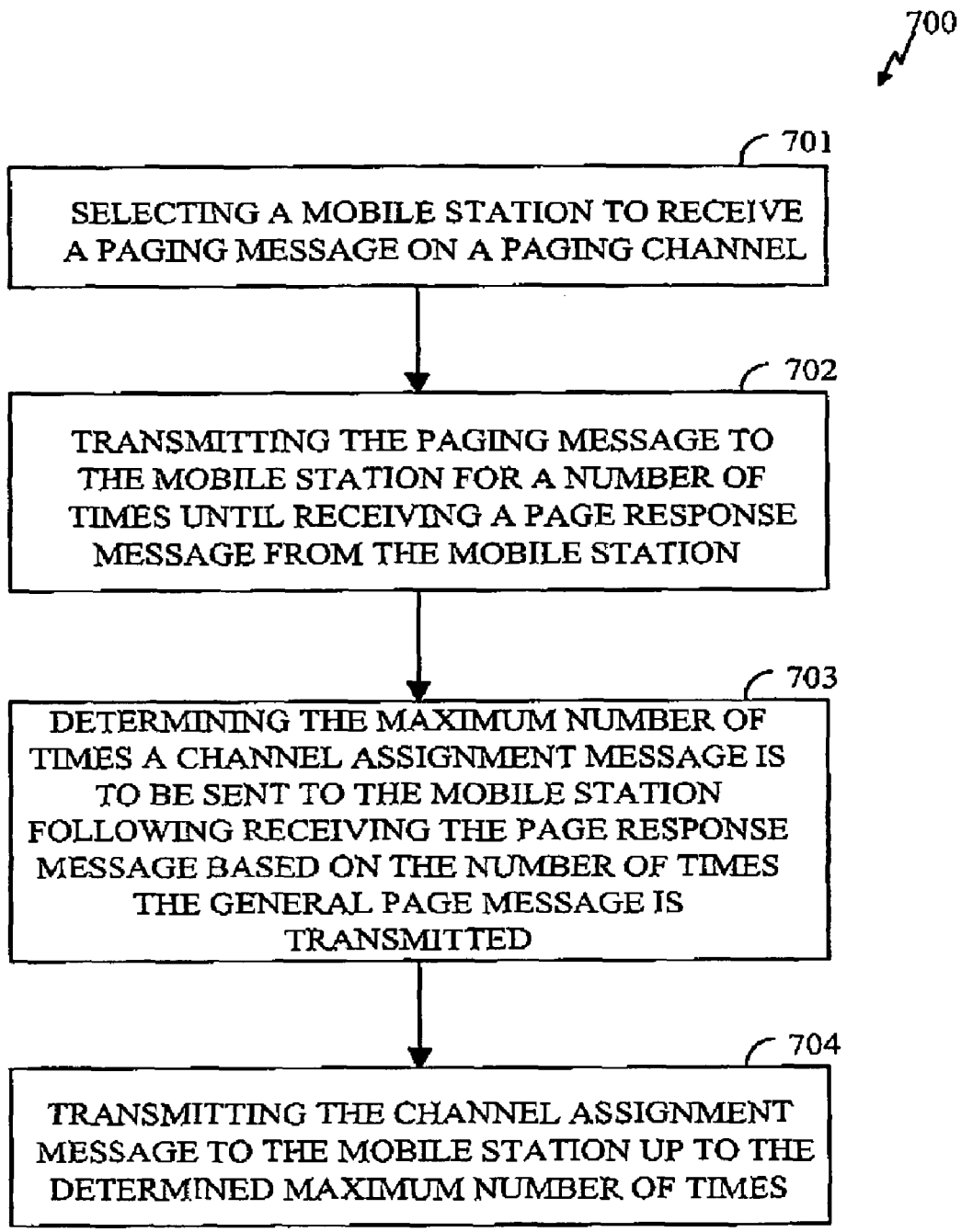
FIG. 7 illustrates a flow diagram for determining the number of times a channel assignment message is transmitted on a paging channel in accordance with various aspects of the invention.

The base station may not have access to information about whether the mobile station is using receive diversity. In accordance with various aspects of the invention, the number of times the channel assignment message to be transmitted to the mobile station is based on the number of times the general page message is transmitted to the mobile station before receiving a page response message. Various aspects of the invention may be more apparent by referring to flow diagram 700 shown in FIG. 7. At step 701, the base station controller may select a mobile station to receive a general page message on the paging channel. The transmission of the general page message may be repeated for a number of times until a page response message is received from the mobile station. The mobile station may be using receive diversity. As a result, the number of transmissions on the general page message may be lower for the mobile station with receive diversity than a mobile station without receive diversity. Moreover, the mobile station may be in a favorable location that produces favorable channel condition for receiving transmission from the base station. Therefore, the number of transmissions of the general page message may determine the number of times the channel assignment message is transmitted, in accordance with various aspects of the invention. At step 703, the maximum number of times the channel assignment message is transmitted to the mobile station is determined based on the number of times the general page message is transmitted. For example, when the page response message is received after transmitting the general page message for three times, the channel assignment message is transmitted up to the six times. At step 704, the channel assignment message is transmitted to the mobile station up to the determined number of times. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for transmitting a message on a paging channel, comprising:

selecting a mobile station to receive said message on said paging channel;

determining a number of times said message is to be transmitted to said mobile station on said paging channel based on whether said mobile station is using receive diversity to receive on said paging channel;

transmitting said message to said mobile station up to said determined number of times, wherein said message is a general page message;

determining a number of times said general page message is transmitted to said mobile station before receiving a page response message; and determining a number of times a channel assignment message is to be transmitted to said mobile station, following said receiving said page response message, based on said number of times said general page message is transmitted.

2. The method as recited in claim 1, wherein said message is a general page message.

3. The method as recited in claim 1, wherein said message is a channel assignment message.

4. The method as recited in claim 1, further comprising: transmitting said channel assignment message up to said determined number of times.

5. An apparatus for transmitting a message on a paging channel, comprising:

a controller for selecting a mobile station to receive said message on said paging channel, and for determining a number of times said message is to be transmitted to said mobile station on said paging channel based on whether said mobile station is using receive diversity;

a transmitter for transmitting said message to said mobile station up to said determined number of times, wherein said message is a general page message; and a receiver for receiving a page response message in response to said transmitting said general page message, wherein said controller is further for determining a number of times said general page message is transmitted to said mobile station before said receiving said page response message, and for determining a number of times a channel assignment message is to be transmitted to said mobile station, following said receiving said page response message, based on said number of times said general page message is transmitted.

6. The apparatus as recited in claim 5, wherein said message is a general page message.

7. The apparatus as recited in claim 5, wherein said message is a channel assignment message.

8. The apparatus as recited in claim 5, wherein said transmitter is further for transmitting said channel assignment message up to said determined number of times.

9. A method for a communication system, comprising:

selecting a mobile station to receive a general page message on a paging channel in said communication system;

transmitting said general page message to said mobile station for a number of times until receiving a page response message from said mobile station;

determining a maximum number of times a channel assignment message is to be transmitted to said mobile station, following said receiving said page response message, based on said number of times said general page message is transmitted to said mobile station.

10. The method as recited in claim 9 further comprising:

transmitting said channel assignment message to said mobile station up to said determined maximum number of times.

11. An apparatus for use in a communication system, comprising:

a controller for selecting a mobile station to receive a general page message on a paging channel in said communication system;

a transceiver for transmitting said general page message to said mobile station for a number of times until receiving a page response message from said mobile station;

wherein said controller is further for determining a maximum number of times a channel assignment message is to be transmitted to said mobile station, following said receiving said page response message, based on said number of times said general page message is transmitted to said mobile station.

12. The apparatus as recited in claim 11 wherein said transceiver is further for transmitting said channel assignment message to said mobile station up to said determined maximum number of times.

* * * * *